April 8, 1924.
B. J. MICHAEL
BAND BRAKE
Filed May 9, 1923
1,489,451
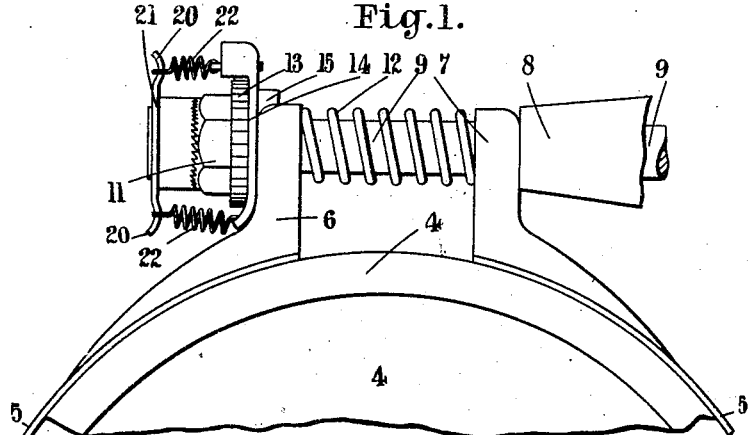
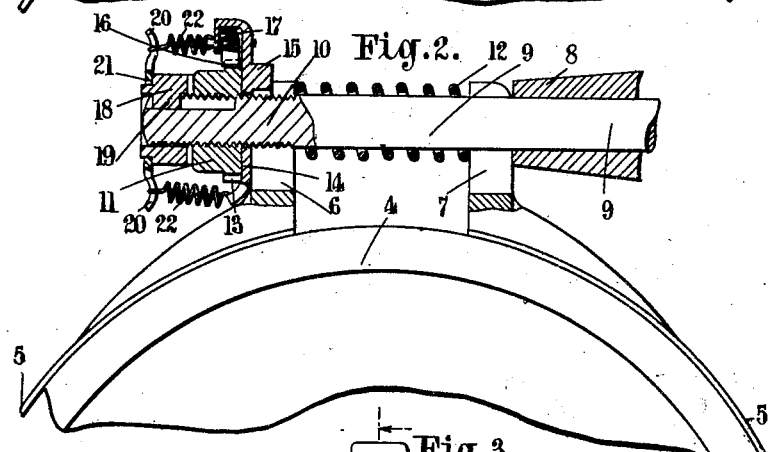
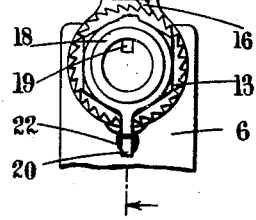
*INVENTOR*
Benjamin J. Michael
by Heard Smith & Tennant
Attys.

Patented Apr. 8, 1924.

1,489,451

UNITED STATES PATENT OFFICE.

BENJAMIN JOHN MICHAEL, OF LLANELLY, WALES.

BAND BRAKE.

Application filed May 9, 1923. Serial No. 637,863.

*To all whom it may concern:*

Be it known that I, BENJAMIN JOHN MICHAEL, a subject of the King of Great Britain, residing at Llanelly, Wales, have invented new and useful Improvements in Band Brakes, of which the following is a specification.

This invention has reference to improvements in and relating to band brakes.

An object of my invention is to provide improved adjusting means whereby, as wear between the brake drum and the band (or friction blocks or material on the latter) takes place, the slack in the band thus brought about will be taken up automatically.

My invention is intended more particularly to be applied to the band brakes of motor cars and will be described as I intend to apply it to Ford cars.

In these cars it is rather troublesome to adjust the brake band when, by reason of wear of the friction surfaces, it has become unduly slack and my invention if applied to such cars will at once overcome this defect.

Further, in view of the fact that a very large number of Ford cars are in use, the constructional form of my invention, hereinafter described with reference to the accompanying drawing, has been especially devised so that my invention may be readily adapted for use in such cars without requiring serious reconstruction.

In the accompanying drawing Fig. 1 is a front elevation; Fig. 2, is a sectional view of Fig. 1; and Fig. 3, is an end view looking from left to right of Fig. 1.

The numeral 4 indicates a brake drum, and 5 the brake band thereon, the latter being provided with the usual upstanding bifurcated ends 6, 7.

8 is a bearing to support the spindle 9, that engages in the slots in 6 and 7, and has its end 10 screw-threaded to receive a nut 11. On the right hand end of the spindle 9 will be fixed the usual lever (not shown) by the actuation of which the ends 6 and 7 are forced together (through the intermediary of cam surfaces) as is well understood; there is also the usual spring 12 that tends to separate the parts 6 and 7 so as to slacken the band on the drum when reverse movement of the lever referred to permits this.

Fixed to or made integrally with the nut 11, is a ratchet toothed rim or wheel 13, and interposed between the nut and the forked end 6 is a washer 14 that has a bore of sufficient size as to allow the screwed end 10 of the spindle 9 to slide freely through it. The said washer is provided with a block 15 that fits snugly in the slot of the end 6 so as to prevent the washer rotating and at its upper part, the washer is formed or provided with a sort of housing in which is mounted a pawl 16, to engage the ratchet teeth of the rim 13 on the nut 11, and which housing also contains a spring 17 that serves to maintain the pawl in engagement with said teeth.

Also mounted on the spindle 9 is a collar 18 that is slidable on the spindle but compelled to rock or oscillate therewith, by a feather 19 which fits in a groove in the spindle and which collar and the nut 11 are formed with interengaging ratchet teeth which, as will be further explained, allow the collar to rotate in one direction independently of the nut but compel both to move together in the opposite direction. The collar has mounted on it a washer 21 having arms 20 extending therefrom, to which and the part 14, springs 22 are connected that serve to maintain the collar normally engaged with the nut.

The number of teeth on the rim 13 is dependent upon (1) the angular distance through which the spindle normally is rocked when the band 5 is brought from the "brake off" to the "brake on" position (and vice versa), and (2) the maximum further angular distance the said spindle shall be permitted to rock, before a taking up of the excess slack (brought about by wear) of the band 5 on the drum 4 is to take place.

For example, if the spindle rocks in normal conditions through an angle of 6 degrees, and it is desirable that the maximum angular movement shall be very slightly more than 7 degrees before the excess slack of the brake band is taken up, I would form 50 teeth on the rim 13, because the distance apart of the teeth would represent slightly more than 7 degrees. The ratchet teeth on the collar 18 (and of course also on the face of the nut) will equal in number those on the rim 13.

The operation of the device is as follows:

As premised, by way of example, when the brake is new and the band 5 properly beds on the drum 4, it will require an angular movement of six degrees to operate the band to its brake off and brake on positions.

At this time the nut 11 is rocked with the spindle 9 by reason of the engagement therewith of the toothed collar 18, and the pawl 16 will remain in engagement against the peripheral face of the tooth wherein it happens to be situate as this rocking takes place.

As wear takes place between the brake band and the drum, the angular distance of rocking movement of the spindle 9, nut 11 and collar 18 will, of course, increase before the band is tightened up to its brake on position.

When this increase of angular movement is such that it requires a rocking movement of the spindle 9 slightly in excess of 7 degrees, the rim 13 will be moved to an extent exceeding the length of the peripheral tooth engaged by the pawl, so that the latter will drop into engagement with the next tooth. When thereafter the spindle 9 rocks back to its normal position the pawl 16 will prevent the nut 11 moving with the spindle, but the latter will carry with it the collar 18 (its teeth riding over those on the face of the nut) the collar thus being moved a distance slightly greater than the length of the ratchet teeth, and on the next succeeding rocking movement of the spindle 9 in the direction to tighten up the brake band, the collar 18 will rotate the nut 11 through the distance of one tooth and to that extent will screw up said nut on the spindle 9 and thereby take up the excess slack in the brake band.

It will be understood that the longer the ratchet teeth on the rim 13 are (i. e. the greater the distance from tooth to tooth) as compared with the angular distance normally required to rock the spindle 9 from the brake off to the brake on position, the greater will be the amount of wear that will have to take place between the brake band and the drum, before the automatic adjustment, to take up the excess slack in the band, takes place, and, of course, the converse also holds good—it being borne in mind that the length of the teeth must not in any case be less and in practice should always be at any rate slightly greater than the distance the spindle is rocked as stated.

As already pointed out the constructional form illustrated of my invention is designed to permit its application with little trouble to braking mechanisms, of the character stated, already in use, but my invention is not limited in its scope thereto. Further, although I have proposed to apply it to braking means used on motor vehicles, it will be obvious that its application is not limited to that but may be applied to any braking means in which a brake band is tightened up on a brake drum.

What I claim is:

In a band brake, a brake drum, a brake band thereon having bifurcated ends, a spindle passing through and supported so as to rock in said ends and having a screw threaded end, a nut on said spindle to rotate thereon, a block on said spindle held against rotation, a ratchet device to connect the block and the nut, a second nut slidable on said spindle, a ratchet device to connect both said nuts and means exterior of said ends to yieldingly maintain the nuts in engagement.

BENJAMIN JOHN MICHAEL.